Patented May 26, 1953

2,640,028

UNITED STATES PATENT OFFICE 2,640,028

INTERCRYSTALLIZED LITHIUM HYPO-CHLORITE-SODIUM SULFATE COMPOSITION

Homer L. Robson, Lewiston, N. Y., assignor to Mathieson Chemical Corporation, a corporation of Virginia No Drawing. Application January 4, 1950, Serial No. 136,856

5 Claims. (Cl. 252—1)

My invention relates to the production of lithium hypochlorite compositions of improved stability containing sodium sulfate and to improvements in the drying procedure for preparing them.

It is well known that lithium hypochlorite is a difficult substance to dry. Attempts to dry it by slowly removing water from crystals of the monohydrate, LiOCl.H$_2$O, have in general resulted in serious decomposition of the lithium hypochlorite and yielded an incompletely dried material. This is because the anhydrous lithium hypochlorite formed by desiccation of the monohydrate is an extremely poor conductor of heat, so that the material in contact with the heating surface may receive excessive exposure to heat, while material a half inch or so from the heating surface may not receive sufficient heat to effect evaporation of the water present as the monohydrate. The heat conductivity of the anhydrous material is known to be appreciably lower than that of, for instance, anhydrous calcium hypochlorite. While various ingenious methods have been devised to secure the desiccation of crystals of the monohydrate, they are in general much more expensive than simple vacuum tray drying which may be employed for materials of higher heat conductivity, such as calcium hypochlorite.

Attempts to spray dry lithium hypochlorite solutions and slurries have not been particularly successful because of the extreme lightness of the dust formed upon such drying and the difficulty of recovering the dried product from the air stream. Such lithium hypochlorite as may be collected in secondary collectors, whether wet or electrostatic, is apt to be so seriously decomposed that it must be reprocessed to recover its content of lithium and put through the process again; the portion caught in the primary or first dust collector is likely to be disappointingly small.

When slurries or solutions of lithium hypochlorite are evaporated on vacuum drum driers, these difficulties are partially eliminated. The film being dried may be set quite thin, as, for example between .020 and .030 inch of thickness, so that the low heat conductivity is not a barrier to successful drying. Further, to the extent that the material can be maintained as a film adhering to the rolls until removed by the scraper knife, there is very little problem of dust loss. This method of drying lithium hypochlorite solutions, to the best of my knowledge, is the only method known to have received any favorable commercial consideration.

However, when a solution of lithium hypochlorite is fed to a vacuum drum drier, the double drum type usually being employed, the results have not been entirely satisfactory. Drying is incomplete, so that the water remaining in the product will be, in general, between 10 and 20% of the available chlorine content of the material. This results from a substantial portion of the material appearing in the product as the monohydrate, rather than as the more stable anhydrous material. While the monohydrate has a fair stability under certain conditions of storage, it has been found poorly adaptable to the wide range of temperatures encountered in ordinary transportation and commercial storage and sale and it is not suitable for incorporation in blends with other alkali salts.

It would be singularly advantageous to obtain an anhydrous material direct from the vacuum drum drier. I have found that the water content in the vacuum drum dried product results largely from failure of the film to adhere closely to the drying surface throughout the drying cycle. Indeed, a very large portion of the lithium hypochlorite may "pop" off the roll before reaching the knife. This "popping" is commonly encountered in attempts to dry salts which form hydrates on drum driers, and frequently renders this type of equipment useless for the drying. I believe that the popping is due to the formation of the anhydrous salt or an unknown lower hydrate from LiOCl.H$_2$O at a temperature not definitely known to me but which is probably in the range of 70–90° C. The formation of the lower hydrate or anhydrous material results in the appearance of a liquid phase when the transition temperature is reached. This liquid phase, upon contacting the heated surface of the drum under the high vacuum ordinarily used, causes a miniature explosion which "pops" a flake of the drying film so that this flake is removed from the drying surface, and does not undergo appreciable additional drying. The popping of the lithium hypochlorite film may become so extensive that substantially all of the material falls off before reaching the scraper knife, giving a material of objectionably high water content.

Numerous proposals have been advanced in an effort to reduce or eliminate the interference with complete drying caused by "popping." For instance, sodium chloride has been added in considerable quantities to lithium hypochlorite solutions since it has been found that the fine crystals of sodium chloride formed by evaporation of the solution have a slight stiffening effect on the film to be dried. However, the popping action is not really eliminated nor is the product dried satisfactorily and, indeed, there is a seriously increased decomposition by reason of the additional water used to keep the added sodium chloride in solution. It has also been proposed to confine the popping to only a portion of the drum drying surface, as by very slow drum speeds and suitable steam pressure. However the material which pops off the roll is extensively decomposed before it can be removed from the drum drier and must still be reprocessed at considerable expense to recover its content of lithium.

I have now discovered that desiccating lithium hypochlorite in the presence of sodium sulfate and as a film on the drying surface and under vacuum drying conditions results in a unique crystalline structure which readily adheres to the drying surfaces and allows for more completely dried, highly useful compositions of lithium hypochlorite. These compositions are particularly characterized by the intercrystallization between the lithium hypochlorite and sodium sulfate grains, the finely grained crystal structure of the pure sodium sulfate, composed of thin, intertwined laths, being responsible in large measure for effectively binding the lithium hypochlorite to the drying surface until a more complete desiccation is effected.

The process conditions as well as nature and quantity of additive are important to the preparation of these improved compositions according to my invention. Essentially, I add the sodium sulfate to the lithium hypochlorite in amounts that will effect the intercrystallization and surface adhesion. The quantity added may be varied considerably and amounts of sodium sulfate as low as 10 to 20% by weight on the hypochlorite may be used. However, I prefer upwards of about 50% and even as much as 100% of sodium sulfate by weight on the lithium hypochlorite. The desiccation is accomplished under vacuum conditions at elevated temperatures while the mixture is dried as a thin layer or film on a suitable surface. For instance, I use a rotating drum surface which may include a single "drum" or a plurality of these surfaces such as a "twin drum" drier. In this way maximum desiccation is possible with considerable operational latitude.

I have found that adding sodium sulfate to lithium hypochlorite will result in these more completely dried compositions. Sodium sulfate differs from other inert salts in that it provides a fine grained crystal structure, composed of thin, intertwined laths, which effectively binds the other salts present to the drum surface, holding them there until drying has been completed and the film scraped off with the scraper knife. Cubes, such as are formed by sodium chloride, are of little value, and some salts which form needle-like crystals do not give adequate adhesion. But even the crystal habit of sodium sulfate varies widely and is dependent in large part upon the drying conditions under which it is formed. I obtain that form of sodium sulfate which results from very rapid evaporation of the aqueous solution of the salt. It is particularly characterized by strong bonding properties, low birefringence and negative elongation. For instance, in contrast, the ordinary form, represented commonly by the mineral thenardite, occurs as a double pyramid structure which exhibits frequent twinning. However, this form requires a considerable time interval for its formation. Formation of thenardite is avoided under my process conditions since I have found that it does not provide a sufficient increase in film adhesion.

By vacuum drying conditions at elevated temperatures, I mean pressure environments less than about 0.5 p. s. i. absolute. On the other hand, the drying temperatures may be varied considerably using steam as in the range approximating 220 to 260° F. For example, an absolute pressure of about 0.35 p. s. i. a. at a steam temperature of 235° F. is particularly advantageous. The composition is dried as a thin film or sheet, say under 0.1 inch of thickness. However, a thickness of about 0.030 to 0.040 is particularly satisfactory as far as good desiccation is concerned and is still consistent with favorable cost considerations. In this way, maximum drying can be effected with a minimum of deleterious effects from the application of heat, such as decomposition, etc.

Sodium sulfate, unlike sodium chloride, is not soluble in lithium hypochlorite solutions to a sufficient extent to permit simple addition. As a result, the addition of sodium sulfate to a solution or slurry of lithium hypochlorite to prepare these final products is not easily accomplished. For instance, a solution carrying 20% lithium hypochlorite, which is a desirable feed strength for a vacuum drum drier, will dissolve less than 0.4% sodium sulfate. If the solution is diluted until it contains only 12% lithium hypochlorite, the sodium sulfate solubility is still under 1% at 30° C. Sufficient dilution to bring the sodium sulfate content up to that of the lithium hypochlorite is impractical, as it involves too much evaporation of water in the drier with consequent excessive decomposition. Because of this, the use of any diluents would appear to be obviously limited to the salts which have good solubility in lithium hypochlorite solutions; for instance, in a 20% lithium hypochlorite solution, sodium chloride may be present to 8%, while in a 12% solution the solubility permits about 15% sodium chloride.

However, I have found that the film to be dried will contain a very satisfactory mixture of lithium hypochlorite and sodium sulfate if it is formed from separate aqueous solutions of each constituent, added separately to and commingled on the drying surface. But, the film may, in the alternative, be formed from a single supersaturated solution of sodium sulfate and lithium hypochlorite deposited on the drying surface.

I prefer to form the film from two separate aqueous solutions of sodium sulfate and lithium hypochlorite mixed on the drying surfaces. Although sodium sulfate is not very soluble in lithium hypochlorite solutions, both sodium sulfate and lithium hypochlorite are soluble in water. Accordingly, I pass, separately to the drying surfaces, an aqueous solution of each salt, say solutions containing, on one hand, about 27 to 30% of sodium sulfate and another containing about 20 to 25% of lithium hypochlorite. Solutions of this strength, which are not supersaturated and which may be unsaturated, can be distributed to the drying surfaces as a spray, from a spreader, or even from a simple valve without clogging difficulties. The discharge of these solutions as a spray, may result in some salt formation about the atomizing nozzle; however, this does not present a serious problem. The water to be evaporated should be kept at a low level. For instance, where there is about a 7:1 water-lithium hypochlorite ratio, the water evaporated per unit of dry salts will be about 3.5 (units) or less, insuring rapid drying of the film.

Where a double drum vacuum drier is employed, the two solutions are advantageously introduced so that they will commingle on the downward traveling drum surface above the pinch, and in the pinch, where the slurry will be evenly distributed on the drum surface. The time interval during which this mixing occurs will be too short to permit formation of the undesirable stable double salt. $Li_2SO_4 \cdot Na_2SO_4 \cdot 3H_2O$. In addition, no significant amount of thenardite will form in this way. The double salt is equant in development, and of no value in causing film adherence. Further, it represents a serious waste of expensive lithium salts, as the lithium combined in the double salt is of no value either during drying or in the product, and extra lithium must be added to allow for it. The drying film will adhere tightly to the drum surface and permit thorough drying. When drying is complete the film is removed by the scraper knife such as a "doctor blade." The turning speed of the drums may be suitably adjusted to permit any desired degree of dryness.

Where a twin drum vacuum drier is employed, with the drums turning upward at the pinch, the sodium sulfate solution may be applied by means of a rotating spreader below the pinch and the lithium hypochlorite solution applied in or above the pinch by any suitable means. Similarly, a single drum may be employed with the sodium sulfate applied to the drum surface ahead of or together with the lithium hypochlorite solution. The crystals of lithium hypochlorite monohydrate are laid down after the sodium sulfate layer, and are held together by the sulfate crystals.

I prefer to introduce two separate solutions, of sodium sulfate and of lithium hypochlorite, since this procedure permits greater operational latitude. For instance, longer runs with less supervision are possible because clogging difficulties are reduced.

In the alternative, a single highly supersaturated solution of sodium sulfate and lithium hypochlorite may be deposited on the drying surface in accordance with my invention. Such a solution may be made by combining with minimum agitation, strong solutions of lithium sulfate and sodium hypochlorite. For instance, a solution of about 20 to 24% lithium sulfate maintained at about 30° C. and a solution of about 33% sodium hypochlorite containing about 8% NaCl may be carefully admixed from separate streams so that no precipitation of sodium sulfate occurs for about a minute. Accordingly, while the solution is in such a supersaturated state, it is passed into the vacuum chamber and fed, for example, into the pinch between the rolls of a double drum vacuum drier. To avoid excessive splashing from the pinch, which may lead to crystallization and thus clog the feed pipe, the rate of feed should be held steady and at a rate which permits distribution throughout the length of the pinch without building up much depth beneath the feed pipe. Best results are obtained when the rate of feed does not supply enough material to completely cover the drum surface, so that the ends are bare or only irregularly covered with a drying film. An intermittent feed will result in serious splashing causing an excessive portion of the feed to be splashed around inside the drying chamber, where it will be exposed to heat over a protracted period and substantially decompose. Removal and reworking of such splashed material to recover the lithium values is both difficult and expensive. Unfortunately, the supersaturated solution may not be prepared in advance, as sodium sulfate will precipitate. Much of this precipitated sulfate will be in the form of thenardite crystals. While these crystals have some value in improving the adherence of the drying film as I have mentioned, they are much less desirable than the lathlike, low birefringence form developed by quick evaporation. Further, if the solution is kept for much more than a minute, the undesirable stable salt ($Li_2SO_4 \cdot Na_2SO_4 \cdot 3H_2O$) will form. While this double salt hydrate is the stable form, it develops slowly during the first few minutes, so that the bulk of the precipitate may be thenardite. However, within ten minutes of storage at 30° C. the bulk of the precipitate will ordinarily change to this salt. Quite large crystals may be formed, which block the inlet valve feeding solution or slurry to the vacuum chamber.

Lithium hypochlorite compositions prepared by my invention result in a drier product because of the sodium sulfate addition. Both the sodium sulfate and lithium hypochlorite in the final product are substantially anhydrous. But there are other advantages. For instance, the density of the particles comprising my final product are greater than, to the best of my knowledge, any other lithium hypochlorite compositions prepared in any other way. The final product is not a mere mechanical admixture; each particle is of substantially the same density as another whereas in mechanical admixtures the individual particles will vary in density. This advantage prevents my compositions from being "dusty." And with sodium sulfate as the diluent and binder, the apparent density of the flaked product derived from the drier may be equal to or even less than a flaked product obtained with sodium chloride as a diluent. This is probably because the sulfate-containing flakes are stronger and resist breaking in the discharge mechanism, while the chloride flakes are easily crumbled. When the flakes are passed through a granulator or other crusher so that all will pass a given mesh size, such as a 20 mesh screen, a pronounced difference in density will be observed. For instance, a lithium hypochlorite containing sodium chloride as a diluent may have a minimum apparent density of 0.35 while lithium hypochlorite containing sodium sulfate will have a minimum apparent density of 0.55. These values will vary, of course, according to the method of granulating or crushing employed, and are for a material of about 40% available chlorine content.

Another advantage lies in the slower rate of moisture pickup which is obtained with the sulfate containing material. For example, five gram portions of several lithium hypochlorite preparations containing sodium sulfate as the diluent and binder were exposed for two hours in 55 mm. diameter weighing bottles with the covers removed to air of 30% relative humidity. These compositions had been granulated to pass 16 mesh. During the two hour period they increased in weight only as much as 20 milligrams. In contrast, a lithium hypochlorite composition containing sodium chloride as the diluent gained 180 milligrams in weight from the moisture in the ambient air. In fact, with air of even higher humidity still greater contrasts will be evident.

Another advantage of these compositions lies in their greater stability when blended with alkali materials. Where no diluent is employed, the lithium hypochlorite will be quite dusty, and contain many very fine particles. When these are blended with alkali salts, such as sodium carbonate, some reaction takes place forming sodium hypochlorite, which promptly decomposes with resultant loss of available chlorine. I have found that the greater density of my compositions is an advantage in such blends, as there is appreciably less reaction with such materials as sodium carbonate. Consequently, although a chloride-containing preparation and a sulfate-containing preparation may have equal stability in the unblended state, my composition will give more stable mixtures with alkali salts than the chloride-containing one or one of high purity lithium hypochlorite which is likely to be quite light and dusty.

I claim:

1. In the drying of lithium hypochlorite compositions as a film on a drying surface under vacuum conditions at elevated temperatures, the improvement which comprises drying the lithium hypochlorite in contact with an amount of sodium sulfate sufficient to effect adhesion of the lithium hypochlorite to the drying surface.

2. The improvement according to claim 1 wherein the lithium hypochlorite composition containing the sodium sulfate is introduced to the drying surface as a single supersaturated solution of lithium hypochlorite and sodium sulfate.

3. The improvement according to claim 1 wherein the lithium hypochlorite composition containing the sodium sulfate is introduced to the drying surface as separate solutions of lithium hypochlorite and of sodium sulfate and are commingled on the drying surface.

4. The process for drying lithium hypochlorite compositions which comprises introducing lithium hypochlorite and sodium sulfate to a drying surface, the sodium sulfate being added in an amount sufficient to effect adhesion of the lithium hypochlorite to the drying surface, forming a film of a mixture of the lithium hypochlorite and sodium sulfate on the drying surface, and drying the mixture at an elevated temperature and under vacuum conditions.

5. A composition of matter consisting essentially of intercrystallized substantially anhydrous lithium hypochlorite and 10% to 100% by weight, based on the lithium hypochlorite, of substantially anhydrous sodium sulfate, characterized by the high density and the finely grained crystal structure of the intimately intercrystallized components with the sodium sulfate in the form of thin, inter-twined laths exhibiting low birefringence and negative elongation relative to thenardite.

HOMER L. ROBSON.

References Cited in the file of this patent

UNITED STATES PATENTS

| Number | Name | Date |
|---|---|---|
| 1,678,987 | MacMahon | July 31, 1928 |
| 1,916,770 | Reitz et al. | July 4, 1933 |

FOREIGN PATENTS

| Number | Country | Date |
|---|---|---|
| 581,944 | Great Britain | Oct. 30, 1946 |